United States Patent [19]
O'Neill et al.

[11] 3,884,346
[45] May 20, 1975

[54] CONVEYOR UNIT

[75] Inventors: Patrick O'Neill; Patrick Joseph Douglas, both of Dungannon, Northern Ireland

[73] Assignee: Powerscreen International Limited, Dungannon, Northern Ireland

[22] Filed: June 21, 1973

[21] Appl. No.: 372,293

[30] Foreign Application Priority Data
June 22, 1972 United Kingdom............... 29399/72
Aug. 26, 1972 United Kingdom............... 39925/72

[52] U.S. Cl. ................................. 198/99; 198/100
[51] Int. Cl. ............................................. B65g 37/00
[58] Field of Search ............ 198/117, 118, 119, 97, 198/98, 99, 100, 125

[56] References Cited
UNITED STATES PATENTS

| | | | |
|---|---|---|---|
| 400,270 | 3/1889 | Thorpe ............................... | 198/125 |
| 413,045 | 10/1889 | Gabbey............................... | 198/125 |
| 583,649 | 6/1897 | Knapp................................. | 198/125 |
| 1,620,268 | 3/1927 | McVicker ..................... | 198/125 X |
| 2,814,377 | 11/1957 | Jirak ................................... | 198/100 |
| 3,226,043 | 12/1965 | Bowman ........................ | 198/125 X |

*Primary Examiner*—Allen N. Knowles
*Assistant Examiner*—Hadd Lane
*Attorney, Agent, or Firm*—Young & Thompson

[57] ABSTRACT

This invention relates to an articulated conveyor assembly, and to a conveyor unit for use as a loading end extension or as a delivery end extension for a main conveyor in, for example, a material handling apparatus, or for use as a delivery end extension for each conveyor and/or chute incorporated in apparatus, for example screening apparatus, crushing apparatus or de-watering apparatus.

The conveyor unit includes an elongate framework carrying at least two transverse, longitudinally spaced rollers, one of which is driven by a hydraulic motor, an endless conveyor belt entrained around said spaced rollers, said framework including means for mounting the framework on a main conveyor, and being mounted for transverse pivotal movement at a location above the framework and at a location below the framework to enable the framework to be pivoted relative to the main conveyor, the two locations being vertically aligned, and a swivel arrangement being incorporated in the means for mounting the framework for rotating the framework relative to the means for mounting the framework.

1 Claim, 8 Drawing Figures

CONVEYOR UNIT

This invention relates to an articulated conveyor assembly, and to a conveyor unit for use as a loading end extension or as a delivery end extension for a main conveyor in, for example, a material handling apparatus, or for use as a delivery end extension for each conveyor and/or chute incorporated in apparatus, for example screening apparatus, crushing apparatus or de-watering apparatus (hereinafter and in the claims referred to simply as "a main conveyor").

The purpose of the loading end extension is to enable said main conveyor to be used, without its location being changed, for conveying and, if necessary, elevating, articles or material fed onto the loading end extension when it is in one of several different angular locations in both the horizontal and vertical planes relative to said main conveyor, and the purpose of the delivery end extension is to enable said main conveyor to be used, without its location being changed, to convey, in the case of material handling, articles fed along or up the main conveyor in one of several different angular locations in both the horizontal and vertical planes relative to said main conveyor and in the case of, for example screening discrete material, deposit material being fed along or up the conveyor in one of several different angular locations to the main conveyor, for example for stockpiling different grades of material in separate locations or for stockpiling material at one location and vehicle loading material at another location.

The present invention is a conveyor unit including an elongate framework carrying at least two transverse, longitudinally spaced pulleys, at least one of which is adapted to be driven, an endless conveyor belt entrained around said spaced pulleys, said framework including means for mounting the framework on a main conveyor, said framework being adapted for transverse pivotal movement at a location above the framework and at a location below the framework to enable the framework to be pivoted relative to the main conveyor.

Preferably, the locations are vertically aligned.

Preferably also, said means for mounting the framework includes a channel-section or C-frame adapted to be disposed at an end of the main conveyor with its web upright and the channel opening away from the main conveyor, and in which the upper location comprises a stub spindle projecting upwardly from the upper arm of the C-frame and having the outer end of a supporting brace journalled thereon, the inner end of the brace being secured to the framework, and the lower location comprising a swivel arrangement extending upwardly from the lower arm of the C-frame and being secured to the framework under the feed end of the conveyor belt, the framework being carried on bearings on the lower arm of the C-frame.

Preferably also, the swivel arrangement comprises a rotary actuator for rotating the framework and conveyor belt relative to the C-frame and prime mover means to rotate the actuator. The prime mover means may be a hydraulic motor.

Preferably further, the C-frame is articulated on to the structure of the main conveyor and is adapted for adjustment in the vertical plane whereby the upper and lower locations can be maintained in vertical alignment.

The present invention is also an articulated conveyor assembly including a main conveyor and one or more conveyor units articulated thereto, the or each conveyor unit being as defined in any of the five next preceding paragraphs.

Embodiments of the present invention will now be described, by way of example, with reference to the accompanying drawings, in which.

Figure 1:
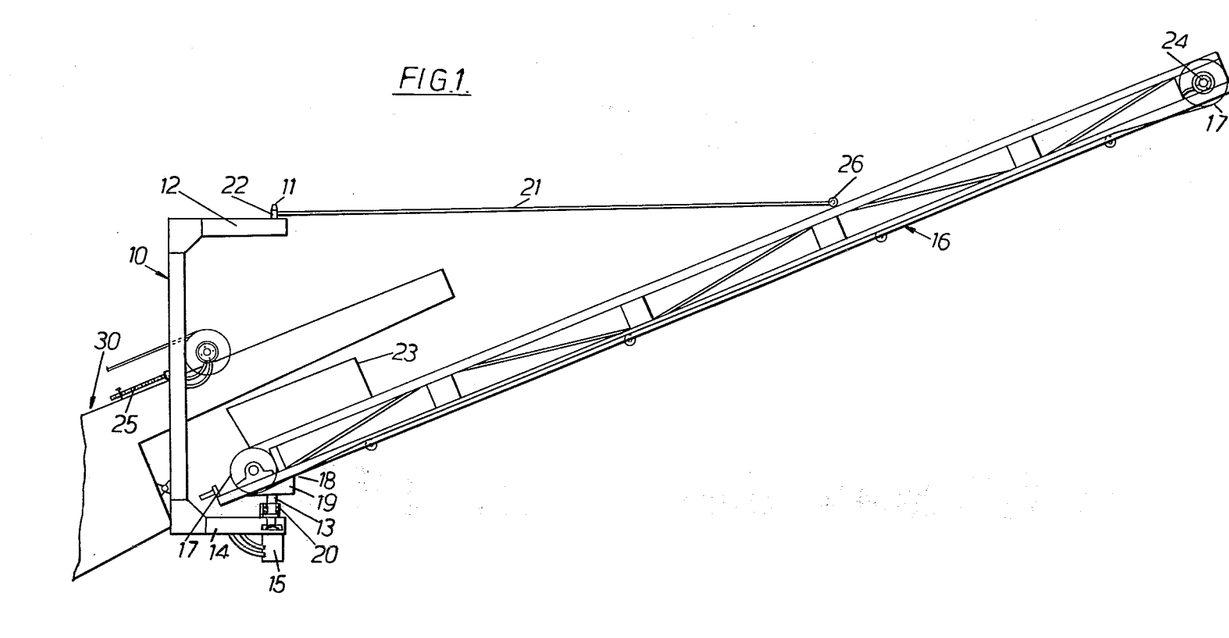
FIG. 1 is a side elevational view of a conveyor unit according to a first embodiment of the present invention.

In a first embodiment and referring to FIGS. 1, 2, 3, 4, 6A, 6B and 7, a conveyor unit includes a channel-section or C-frame 10 adapted to be disposed at an end of a main conveyor with its web upright and the channel opening away from the main conveyor. A stub spindle 11 projects upwardly from the upper surface of the upper arm 12 of the C-frame 10 and a swivel arrangement comprising a rotary actuator 13 is provided on the lower arm 14 of the C-frame 10. The actuator 13 is hydraulically driven and the hydraulic motor 15 is mounted on the undersurface of the lower arm 14 with the actuator 13 projecting up through the arm 14. An elongate framework 16 is provided carrying two transverse, longitudinally spaced pulleys 17, one at each end thereof and around which an endless conveyor belt 18 is entrained. The framework 16 is carried by the C-frame 10, and is angled relative to the upper arm 12 and lower arm 14. The framework 16 at the loading end of the conveyor belt 18 is provided with a submounting 19 to which the actuator 13 is connected, the base of the submounting 19 being journalled in roller bearings 20. A supporting brace 21 comprises two members, diverging away from a sleeve 22 which is journalled on the stub spindle 11, the outer end of each member being pivotally mounted transverse of the framework at 26, one member on each longitudinal side of the framework 16. The location of the pivotal mountings of the brace 21 to the framework 16 is beyond mid-way of the length of the framework 16 from the loading end of the conveyor belt 18. A feed boot 23 is provided above the belt 18 at the feed end of the conveyor belt 18 and when the conveyor unit is mounted on a main conveyor 30, the feed boot 23 is located under the delivery end of the main conveyor. The pulley 17 at the delivery end of the conveyor belt 18 is hydraulically driven by a hydraulic motor 24 (FIG. 1). The two hydraulic motors 15, 24 are both connected to the hydraulic circuit of the main conveyor 30.

In FIG. 1, the C-frame 10 is mounted to the main conveyor 30 by being adapted adjacent to the lower end of its upright web to be hingedly connected about a horizontal axis to the delivery end of the main conveyor 30. Centrally of its upright web, the C-frame 10 is adapted for screw-threaded engagement with an elongate screw member 25 mountable on the main conveyor 30 whereby on rotation of the screw member 25, the C-frame 10 can be adjusted about its hinge until its web is in a vertical plane.

Figures 2, 3:
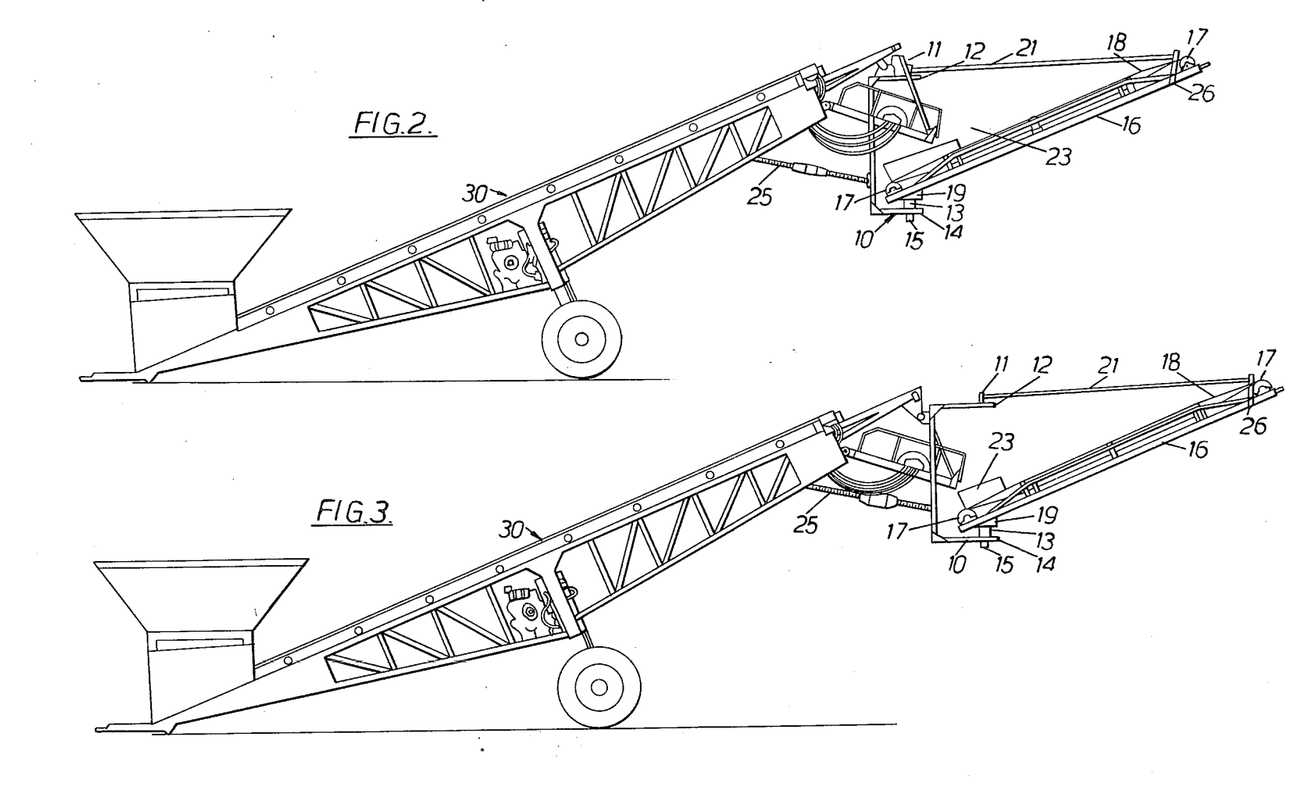
FIG. 2 is a side elevational view of an articulated conveyor assembly according to the present invention and showing a first form of mounting the conveyor unit on a delivery end of a main conveyor forming part of a screening apparatus.
FIG. 3 is a side elevational view of an articulated conveyor assembly showing a second form of mounting the conveyor unit onto the main conveyor forming part of a screening apparatus.
Figure 4:
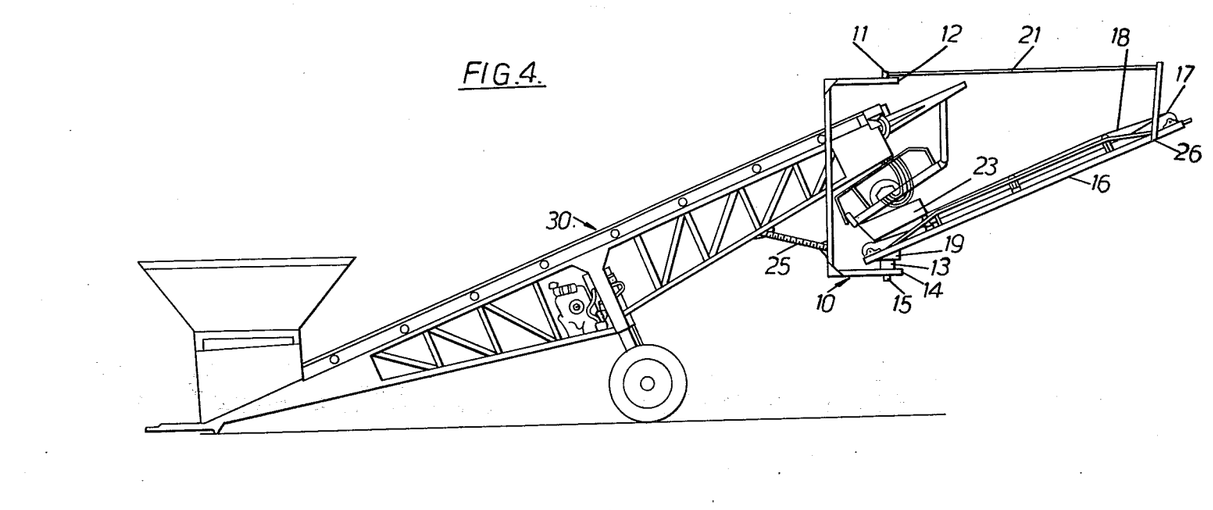
FIG. 4 is a side elevational view of an articulated conveyor assembly showing a third form of mounting the conveyor unit on to the main conveyor forming part of a screening apparatus.

In FIGS. 2, 3 and 4, the C-frame 10 is mounted to the main conveyor 30 in different manners as shown, the hinge point and the screw-member 25 being located in different positions.

Figure 5:
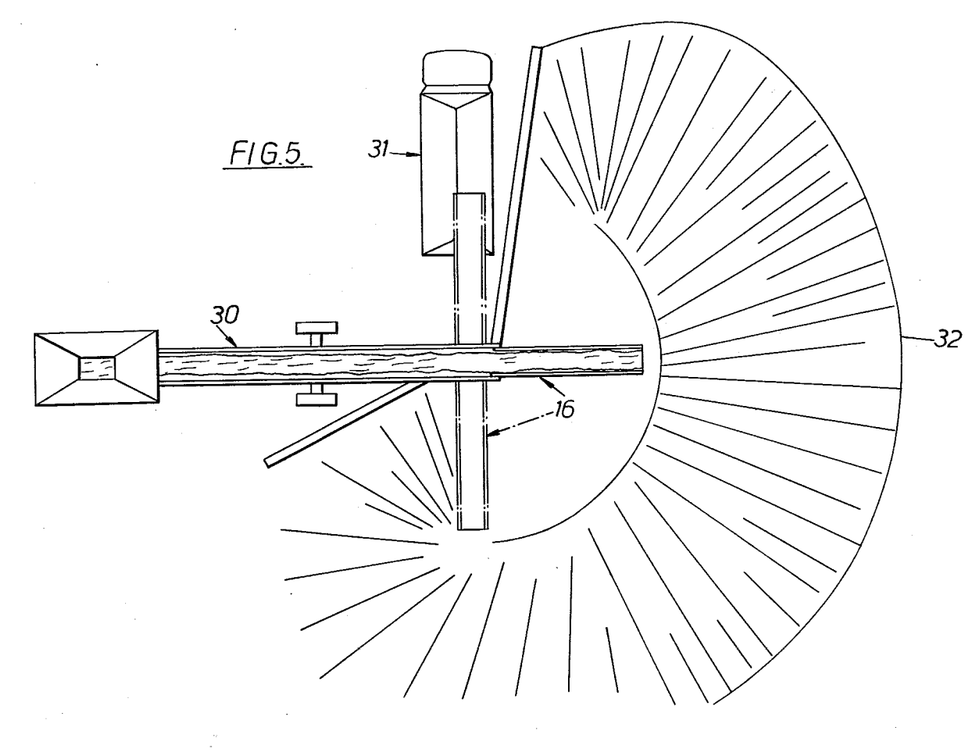
FIG. 5 is a plan view of an articulated conveyor assembly also showing, in dotted formation, different positions of the conveyor unit relative to the main conveyor to enable stockpiling or lorry loading of material to take place.

In one example of use, the conveyor unit is mounted as aforesaid on to the main conveyor 30 forming part of a screening apparatus and the hydraulic motors 15, 24 are connected to the hydraulic circuit of the screening apparatus. The main conveyor is moved into the required discharging position. By rotation of the screw member 25, the stub spindle 11 and the actuator 13 are vertically aligned. Thereafter, any material fed up the main conveyor 30 will fall from the delivery end thereof into the feed boot 23 and up the conveyor belt 18 to the delivery end of the conveyor unit to be deposited at a location therebelow. The actuator 13 can be energised to rotate the framework 16 and belt sideways through an arc of at least 270 angular degrees relative to the C-frame 10 mounted onto the main conveyor 30. On the ground, within the arc of movement of the framework 16, a vehicle loading bay and one or more stockpiling areas can be provided whereby, without the necessity of altering the location of the main conveyor 30, as shown in FIG. 5, material, for example, stone aggregate, can be fed into a truck 31 or can be stockpiled in one or more different areas 32 simply by pivoting the framework 16 and conveyor belt 18 transversely relative to the C-frame 10 and main conveyor 30.

The C-frame 10 may be adjusted about its hinge to lie in a vertical plane by adjustment means other than screw-threaded engagement with an elongate screw member.

The angle of the framework 16 to the horizontal may be adjusted by providing a length-adjusting brace 21 or alternatively the mounting 26 on the framework 16 to which the brace 21 is secured may be adapted for movement along the framework 16; extension of the length-adjusting brace 21 or movement of the mounting 26 towards the C-frame 10 decreasing the angle of the framework 16 relative to the horizontal plane, and retraction of the length-adjusting brace 21 or movement of the mounting 26 away from the C-frame 10 increasing the angle of the framework 16 relative to the horizontal plane.

Figure 6A:
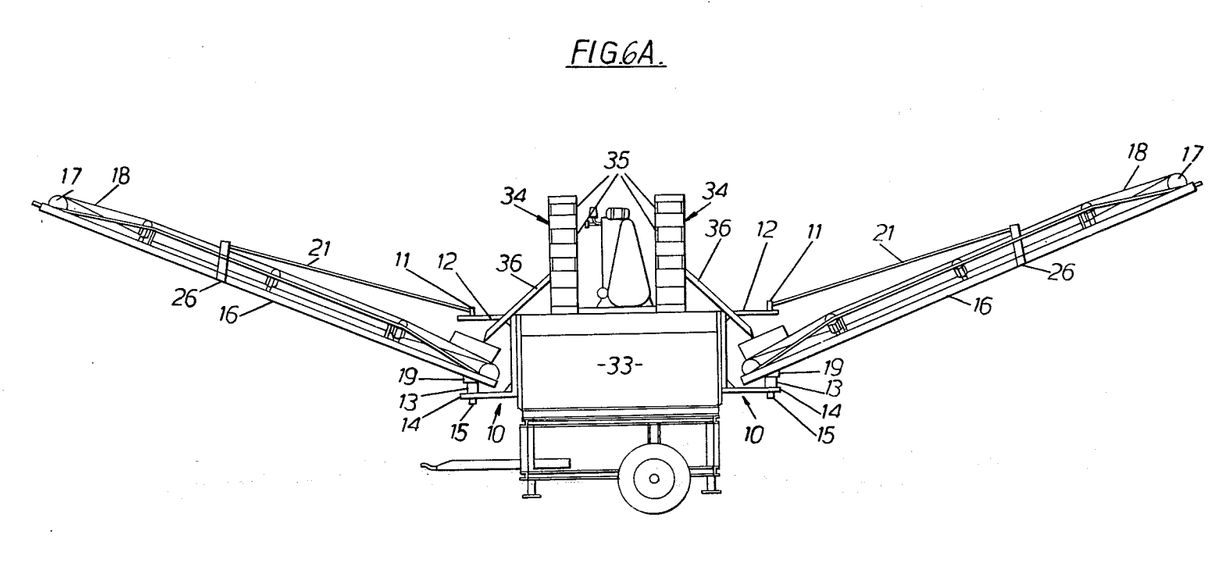
FIG. 6A is a side elevational view of an articulated conveyor assembly according to the present invention and showing two conveyor units, one each mounted under the lower end of a chute of a main conveyor forming part of a de-watering apparatus.
Figure 6B:
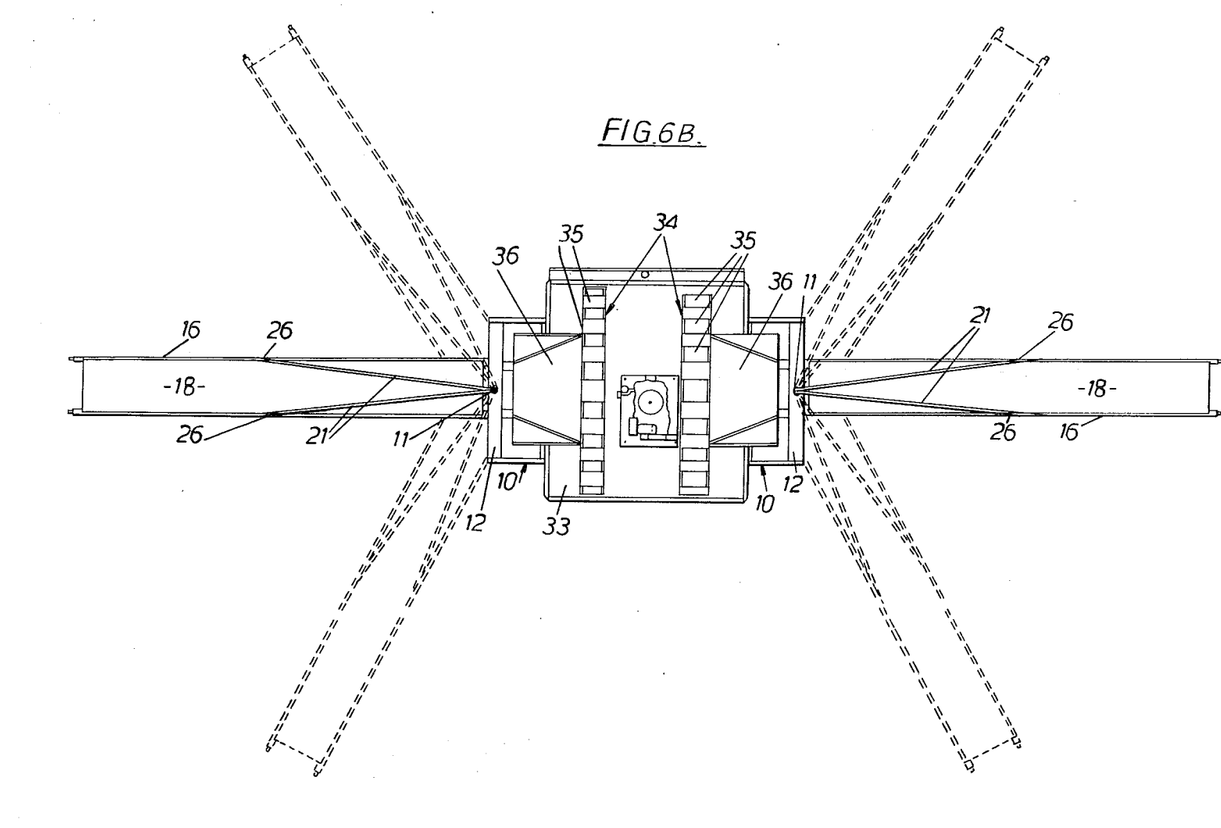
FIG. 6B is a plan view of FIG. 6A showing also, in dotted formation, different positions of the conveyor units relative to the chutes.

In a second example of use, with reference to FIGS. 6A and 6B, a conveyor unit is mounted on a main conveyor forming part of a de-watering apparatus which includes a tank 33 having an inlet and outlet and in which one or more wheels 34 are mounted each for rotation in a vertical plane. Each wheel 34 carries a series of radially mounted buckets 35, each of which is adapted to be tipped upside down at the top of the circular path of the respective wheel 34 when rotated, the contents of the buckets 35 each being dropped onto a chute 36. One conveyor unit is provided for each wheel 34 and is located below the lower end of the chute 36 with the feed boot 23 located under the delivery end of chute 36, each conveyor unit having its C-frame 10 secured to the side of the tank 33.

The hydraulic motors 15, 24 are connected to the hydraulic circuit for driving the wheels 34 and any material, for example sand, fed down the chute 36 from the buckets 35 will fall from the delivery end thereof into the feed boot 23 and up the conveyor belt 18 to the delivery end of the conveyor unit to be deposited at a location therebelow. The actuator 13 can be energised to rotate the framework 16 and the belt 18 sideways through an arc of at least 270 angular degrees relative to the C-frame 10. On the ground, within the arc of movement of the framework 16, a vehicle loading bay and one or more stockpiling areas can be provided whereby, without the necessity of altering the location of the de-watering apparatus, material can be fed into a truck or can be stockpiled in one or more different areas simply by pivoting the framework 16 and conveyor belt 18 transversely relative to the C-frame 10 and de-watering apparatus. Also, in the first and second examples, the material can be fed from the delivery end of the conveyor belt 18 to fall therefrom into a hopper or feed box of another conveying apparatus for further processing of the material.

Figure 7:
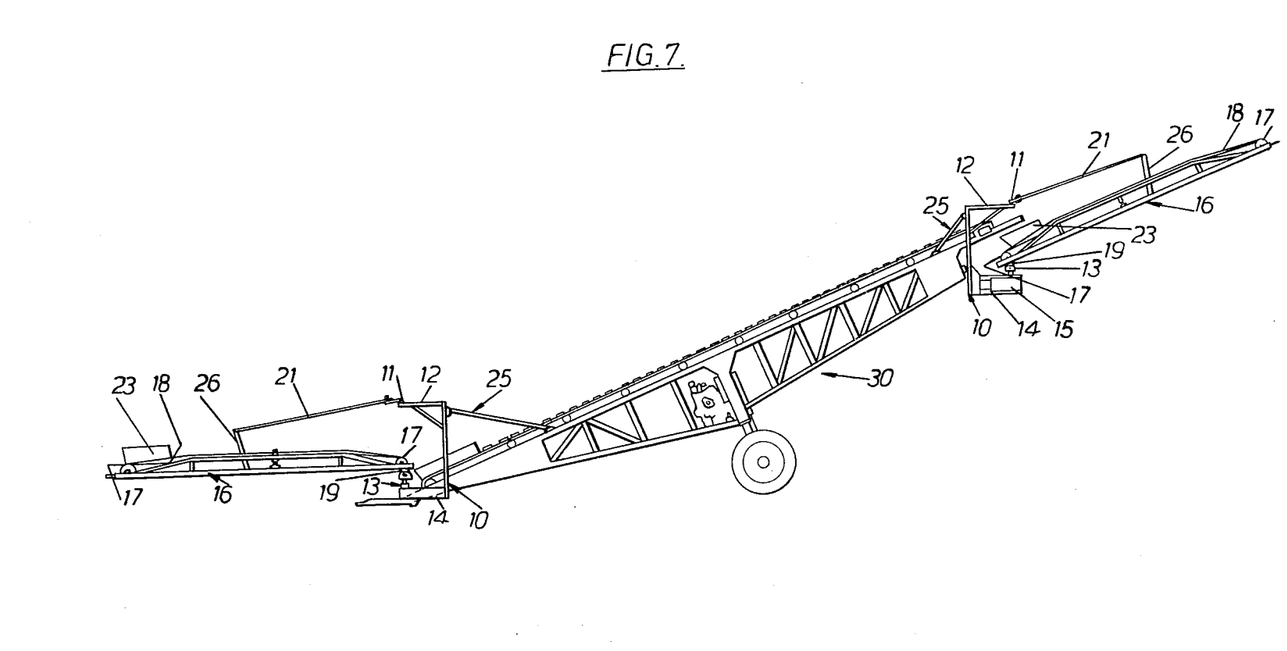
FIG. 7 is a side elevational view of an articulated conveyor assembly including two conveyor units, one mounted at the loading end and one mounted at the delivery end of a main conveyor.

In a third example of use, reference FIG. 7, two conveyor units are mounted on a main conveyor of a material handling elevating apparatus, one being mounted at each of the loading end and the delivery end of the main conveyor 30. In the case of the conveyor unit at the loading end, the framework 16 is mounted at its delivery end to the C-frame 10 rather than at its loading end as has been described hereinbefore. The two sets of hydraulic motors 15, 24 are connected to the hydraulic circuit for driving a flat or slotted belt of the apparatus and any goods to be conveyed from one level to another level can be placed in the feed boot 23 of the loading end conveyor unit fed therealong, transferred to a feed boot on the main conveyor, fed thereup, transferred to the feed boot 23 of delivery end conveyor unit and fed therealong to be removed manually from the delivery end thereof or vice versa. The actuator 13 of each conveyor unit can be energised to rotate the respective framework 16 and belt 18 sideways through an arc of at least 270 angular degrees relative to the C-frame 10. On each level, within the arc of movement of each framework 16, one or more goods loading or goods unloading areas can be provided whereby, without the necessity of altering the location of the main conveyor, goods can be loaded or unloaded to different areas simply by pivoting the respective framework 16 and conveyor belt 18 transversely relative to the respective C-frame 10 and material handling apparatus.

In each embodiment, the conveyor unit may be rotated by means other than a hydraulic actuator.

A screening grid may be provided for mounting at the delivery end of the conveyor unit in the embodiments for use with a main conveyor forming part of screening apparatus, crushing apparatus or the like, where material conveyed by the conveyor unit requires to be screened.

A concrete-mixing or other apparatus may be located on the ground below the delivery end of the conveyor unit.

We claim:

1. A conveyor assembly comprising a main conveyor; an extension conveyor unit comprising an upright C-frame, a framework mounted on said C-frame and a conveyor mounted on said framework, said framework being pivotally mounted along an upright axis on the lower arm of the C-frame and connected to the upper arm by a brace, also pivotally mounted along said axis; attachment means mounting said C-frame to the off-loading end of said main conveyor, comprising a pivotal connection for pivotal movement of the C-frame relative to the main conveyor in a vertical plane and a length adjustable rod which is adjustable to pivot the C-frame relative to the main conveyor in said vertical plane.

* * * * *